Figures 1, 2:
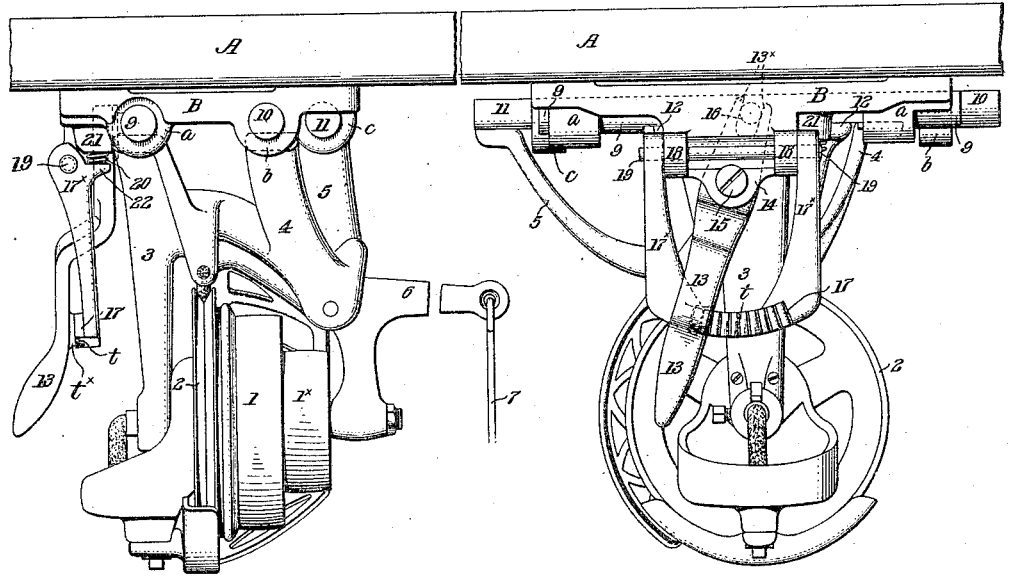

A. H. DE VOE.
ADJUSTABLE HANGER FOR POWER TRANSMITTERS.
APPLICATION FILED AUG. 21, 1914.

1,182,255.

Patented May 9, 1916.
2 SHEETS—SHEET 1.

WITNESSES:
L. E. Fischer.
W. P. Stewart.

INVENTOR
Albert H. De Voe,
BY
Henry J. Miller
ATTORNEY

A. H. DE VOE.
ADJUSTABLE HANGER FOR POWER TRANSMITTERS.
APPLICATION FILED AUG. 21, 1914.

1,182,255.

Patented May 9, 1916.
2 SHEETS—SHEET 2.

WITNESSES:
L. E. Fischer.
W. P. Stewart.

INVENTOR
Albert H. DeVoe
BY
Henry J. Miller
ATTORNEY

UNITED STATES PATENT OFFICE.

ALBERT H. DE VOE, OF WESTFIELD, NEW JERSEY, ASSIGNOR TO THE SINGER MANUFACTURING COMPANY, A CORPORATION OF NEW JERSEY.

ADJUSTABLE HANGER FOR POWER-TRANSMITTERS.

1,182,255.  Specification of Letters Patent.  Patented May 9, 1916.

Application filed August 21, 1914. Serial No. 857,806.

*To all whom it may concern:*

Be it known that I, ALBERT H. DEVOE, a citizen of the United States, residing at Westfield, in the county of Union and State of New Jersey, have invented certain new and useful Improvements in Adjustable Hangers for Power-Transmitters, of which the following is a specification, reference being had therein to the accompanying drawings.

This invention relates to adjustable hangers for power-transmitters and it has for its object to provide devices adapted to facilitate the adjustment of the driving and transmission belts leading to and from the power-transmitter, the device being especially adapted for use in connection with power-transmitters for sewing machines, and improving the method illustrated in United States patent to Miller & Marx No. 703,942, of July 1, 1902. In the aforesaid patent the power transmission device comprises the motor-pulley of an electric motor, which is bodily adjustable by means of screws to tighten or slacken the driving belt connecting the motor-pulley with the driving pulley of a sewing machine.

In the present improvements the power-transmitter—which comprises the usual driving and transmission pulley with connected starting lever and brake device—is capable of bodily movement for the same purpose as that for which the Miller et al. construction was designed, but the means employed permit a quick adjustment of the transmission belts, and the belts may be instantly relieved of tension when desired. The power-transmitter is mounted in a hanger slidingly connected to a supporting bracket secured to the under face of the power-table which receives the machine or machines to be driven by the transmission belt.

A shifting lever fulcrumed upon the supporting bracket engages a stud upon a member of the hanger and may be operated to bodily move the latter and thereby to tighten or loosen the belts, the hanger being held in its adjusted position by means of a pivotal spring-pressed segment-ratch which is engaged by a tooth of the shifting lever. The construction is such that the operator may tighten the belts by swinging the shifting lever in the required direction and the operator may instantly retract the segment-ratch and thereby automatically relieve the belts of tension.

Figure 3:
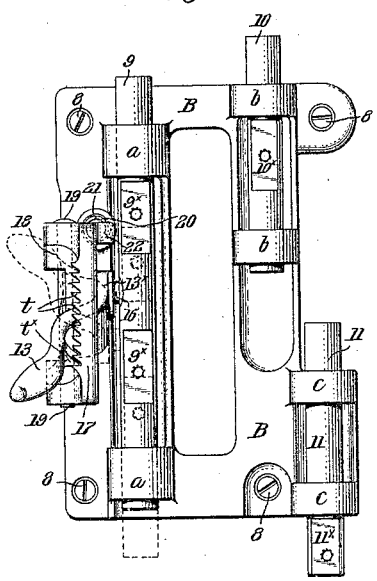
Figure 4:
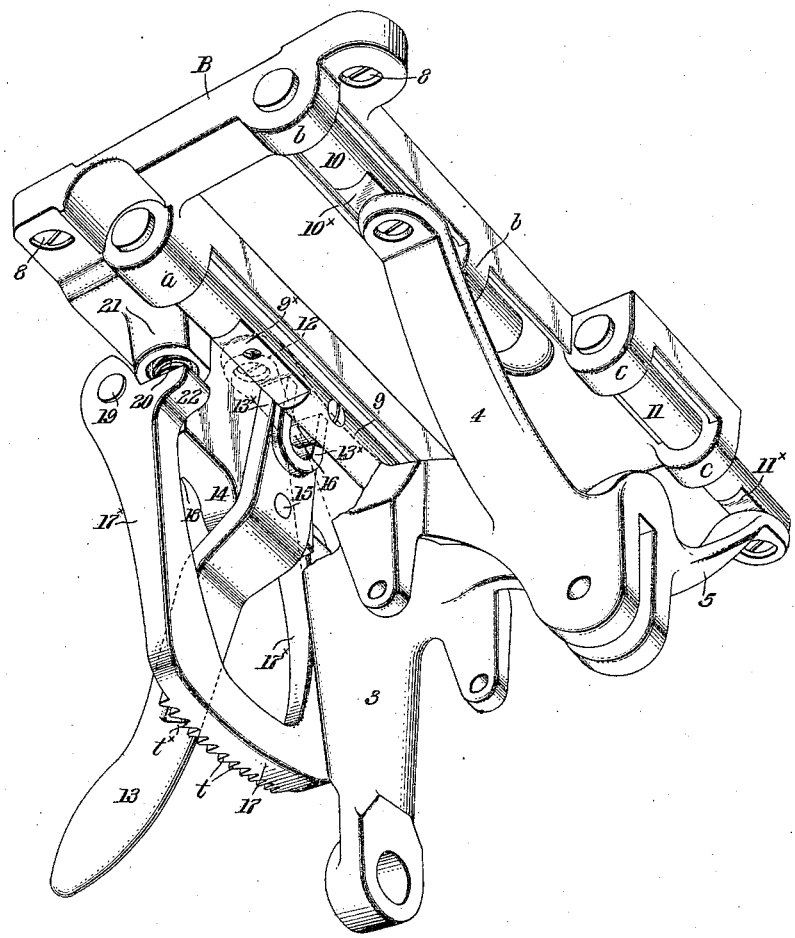

In the drawings, Figure 1 is a front elevation of the improvements as applied to a power-table, and Fig. 2 is an end elevation of the same. Fig. 3 is a bottom view of the supporting bracket, showing the hanger, slide-pins and shifting lever connected thereto, and Fig. 4 is a perspective view of the same parts.

The power-transmitter, which forms no part of the present invention, comprises the usual driving pulleys 1 $1^x$ and the transmission pulley 2 loosely mounted upon a suitable shaft supported by the main arm 3 of a hanger comprising the arms 3, 4 and 5, the latter two arms supporting the usual starting and brake-lever 6 which, in practice, is operated by a treadle through the rod 7. It will be understood that the driving pulleys are connected to the source of power by a suitable belt or belts, and that the grooved transmission pulley 2 may be connected with the machine or machines by means of the usual leather belt of small diameter.

The supporting member for the hanger comprises a bracket B secured by means of the screws 8 to the under face of the power-table A and formed with the depending series of bearing bosses $a$ $b$ $c$, each series comprising two alined bosses offset from the other bosses of the series and adapted to receive and support the slide-pins 9, 10 and 11, respectively. The slide-pin 9 is formed with two flat seats $9^x$ which correspond with a similarly formed seat $10^x$ on slide-pin 10 and a seat $11^x$ on slide-pin 11. The aforesaid seats on slide-pin 9 are provided with threaded apertures and are adapted to receive the lateral extensions or shoulders of the main hanger-arm 3, the said extensions (indicated by numeral 12 in Fig. 2) being secured to the pin by fastening screws. The seat $10^x$ of slide-pin 10 also is provided with a threaded aperture to receive a fastening screw by means of which hanger-arm 4 is secured to the pin, and the long offset hanger-arm 5 is secured to slide-pin 11 in a similar manner, as will be understood without further explanation.

It will be seen that the arrangement above described permits the hanger and the transmitter members supported thereby to be bodily moved relatively to the power-table A, the pins 9, 10 and 11 sliding within their bearing bosses for this purpose.

A shifting lever 13 is employed to move the transmitter and thereby to tighten or loosen its connected belts. The lever 13 is fulcrumed upon the depending extension 14 of bracket B by means of the fulcrum-stud 15, and its forked end 13× embraces a stud 16 which projects from slide-pin 9, the stud being clamped within a suitable aperture formed in the pin. By swinging the shifting lever to the left or right, as occasion arises, the slide-pins and the connected hanger and transmitter will be bodily moved in the desired direction.

Any suitable detent-member may be employed to hold the transmitter in its adjusted position. In the present instance a pivotal spring-pressed segment-ratch 17 is supported by the bracket B in position to be engaged by a tooth $t^×$ projecting from the face of shifting lever 13. The depending extension 14 of bracket B is provided with spaced apertured lugs 18 which receive a pivot-pin 19, the latter passing through the apertured ends of a yoke, comprising the upwardly extending arms 17× of the segment-ratch 17, whereby the ratch is supported to swing toward and from the shifting lever. One face of each tooth $t$ of the ratch 17 is inclined, so that the shifting lever may be freely swung in a direction to tighten the transmitter-belts, but the lever, through its projecting tooth $t^×$, is held against movement in the reverse direction by the angular wall of the adjacent ratch-tooth. Before the lever may be operated to loosen the belt it is necessary to move the ratch against the action of a spring 20 which acts normally to maintain the ratch pressed against the face of the lever. The spring 20 is fitted within a cup 21 on bracket B and presses upon a lug 22 which projects from the ratch at the rear of arm 17×.

It will be understood that various changes may be made in the form and arrangement of the elements herein shown and described without departing from the spirit of the invention. For example, the form of the hanger may be modified, and means other than the pins 9, 10, 11, may be employed to afford a sliding connection between the hanger and its supporting bracket.

Having thus set forth the nature of the invention, what I claim herein is:—

1. In power transmission devices, the combination with a supporting bracket, of a hanger, a pulley supported in said hanger, means connecting the bracket and said hanger and permitting bodily adjustment of the latter, a shifting lever operatively connected to said hanger, and adapted to be manually swung to instantaneously adjust the position of the hanger, and means whereby the hanger may be held in its adjusted position.

2. In power transmission devices, the combination with a supporting bracket, of a hanger, driving and transmission pulleys supported in said hanger, a sliding connection between said hanger and the bracket, means for bodily adjusting the hanger relatively to its supporting bracket to impose tension upon a belt, a detent device for holding the hanger in its adjusted position, and means whereby the detent device may be instantly retracted and the belt automatically relieved of tension.

3. In power transmission devices, the combination with a supporting bracket, of a hanger, a pulley supported in said hanger, means connecting the bracket and said hanger and permitting bodily movement of the latter, a shifting lever fulcrumed upon the bracket and operatively connected to said hanger, a detent member pivotally mounted upon the bracket, and means whereby said detent member may be yieldingly maintained in operative relation with said shifting lever.

4. In power transmission devices, the combination with a supporting bracket provided with alined bosses, of a pin fitted within said bosses, a hanger connected by said pin to the bracket and capable of bodily movement relatively to the latter, a pulley supported in said hanger, a shifting device operatively connected to said hanger, a ratch pivoted upon the bracket for movement toward and from said shifting lever, and a spring normally acting upon said ratch to press the same into operative engagement with the shifting lever.

In testimony whereof, I have signed my name to this specification, in the presence of two subscribing witnesses.

ALBERT H. DE VOE.

Witnesses:
W. LEE HELMS,
WM. P. STEWART.

Copies of this patent may be obtained for five cents each, by addressing the "Commissioner of Patents, Washington, D. C."